(12) United States Patent
Yoshida (10) Patent No.: US 11,778,346 B2
(45) Date of Patent: Oct. 3, 2023

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventor: Yuichi Yoshida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 17/581,610

(22) Filed: Jan. 21, 2022

(65) Prior Publication Data

US 2022/0247945 A1 Aug. 4, 2022

(30) Foreign Application Priority Data

Jan. 29, 2021 (JP) .................................. 2021-013571

(51) Int. Cl.
*H04N 25/60* (2023.01)
*G06T 5/00* (2006.01)
*H04N 25/53* (2023.01)

(52) U.S. Cl.
CPC ............. *H04N 25/60* (2023.01); *G06T 5/002* (2013.01); *H04N 25/53* (2023.01); *G06T 2207/20182* (2013.01)

(58) Field of Classification Search
CPC ........ H04N 25/60; H04N 25/53; H04N 25/59; H04N 25/587; G06T 5/002; G06T 2207/20182
USPC .......................................................... 348/241
See application file for complete search history.

(56) References Cited

U.S. PATENT DOCUMENTS

| | | | | |
|---|---|---|---|---|
| 9,167,169 | B1* | 10/2015 | Rivard | H04N 25/771 |
| 10,110,836 | B2* | 10/2018 | Chang | H04N 25/59 |
| 11,184,565 | B2 | 11/2021 | Kobuse | |
| 2005/0168602 | A1* | 8/2005 | Sumi | H04N 25/778 |
| | | | | 348/E3.018 |
| 2011/0134267 | A1* | 6/2011 | Ohya | H04N 23/76 |
| | | | | 348/222.1 |

(Continued)

FOREIGN PATENT DOCUMENTS

| | | |
|---|---|---|
| JP | 2009-088928 A | 4/2009 |
| JP | 2020-178186 A | 10/2020 |

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

An image processing device includes an imaging element. The imaging element includes a pixel unit including a photoelectric conversion unit configured to convert light to electric charge and a charge accumulating unit configured to accumulate the electric charge and a column AMP configured to amplify a signal output from the pixel unit with different gains, and outputs a plurality of image signals with different gains applied thereto through one exposure. The image processing device further includes an image synthesizing unit configured to generate a synthetic image signal by synthesizing the plurality of image signals. An image synthesis control unit configured to control the image synthesizing unit determines synthesis proportions of the plurality of image signals in the synthetic image signal according to a common capacity of the charge accumulating unit when the capacity of the charge accumulating unit is shared by the plurality of image signals.

8 Claims, 11 Drawing Sheets

(56) References Cited

U.S. PATENT DOCUMENTS

2013/0033630 A1\* 2/2013 Hashimoto ............ H04N 25/75
　　　　　　　　　　　　　　　　　　　348/300
2017/0099423 A1\* 4/2017 Cremers ................ H04N 25/75

\* cited by examiner

IMAGE PROCESSING DEVICE, IMAGE PROCESSING METHOD, AND STORAGE MEDIUM

BACKGROUND OF THE INVENTION

Field of the Invention

The present invention relates to an image processing device including an imaging element which is used for a camera or the like and particularly to an image processing device, an image processing method, and a storage medium for synthesizing a plurality of images to extend a dynamic range of an image.

Description of the Related Art

An imaging element that includes two column circuits for an output signal from a unit pixel, in which amplification units in the column circuits have different gains, and can output images with different gains is known (for example, see Japanese Patent Laid-Open No. 2020-178186). Such an imaging element is called a dual gain output (DGO) sensor. The imaging element can output two images with different gains (a high-gain image and a low-gain image) through one exposure. Synthesis of two images based on DGO has a merit that it is more suitable for a mobile subject because a positioning process is not necessary in comparison with synthesis of two images acquired through time-division exposure (for example, see Japanese Patent Laid-Open No. 2009-088928). Accordingly, this synthesis is compatible with high dynamic range (HDR) synthesis which is a means for acquiring an image with an extended dynamic range.

The imaging element includes a floating diffusion (FD) serving as a capacitor that accumulates electric charge. The magnitude of an accumulable charge capacity of an FD changes according to settings. Since more light can be processed with a larger capacity, the capacity of the FD is increased for a low sensitivity. However, when the capacity of the FD is increased, there is a problem with an increase in noise.

When images are synthesized through time-division exposure, an FD capacity can be appropriately set according to a gain for each exposure. On the other hand, in the case of exposure based on DGO, an FD capacity is shared by a high gain and a low gain. Accordingly, since the FD capacity is shared by the high gain and the low gain, there is a problem in that an appropriate FD capacity cannot be set in some combinations of sensitivities of the high gain and the low gain.

In general examples, it is not realistic to use a small FD capacity at an ISO speed at which a large FD capacity is an appropriate setting. This is because the FD capacity is insufficient and thus the FD is saturated. Accordingly, basically, when FD capacities for the high gain and the low gain are different, setting up the FD capacity for the low gain can be considered. In this case, since the FD capacity of a high-gain image is not set to an appropriate value and the FD capacity increases, noise increases and an influence thereof appears in a synthetic image. In this way, depending on a combination of ISO speeds, there is a problem in that an FD capacity for a high-gain image cannot be set to an appropriate value and noise of a synthetic image increases.

SUMMARY OF THE INVENTION

The present invention was made in consideration of the aforementioned circumstances and an objective thereof is to provide an image processing device that can decrease noise of a synthetic image when two images with different gains which are output through one exposure are synthesized.

In order to achieve the objective, according to the present invention, there is provided an image processing device including: an imaging element that includes a pixel unit including a photoelectric conversion unit configured to convert light to electric charge and a charge accumulating unit configured to accumulate the electric charge and an amplification unit configured to amplify a signal output from the pixel unit with different gains and outputs a plurality of image signals with different gains applied thereto through one exposure; an image synthesizing unit configured to generate a synthetic image signal by synthesizing the plurality of image signals; and an image synthesis control unit configured to control the image synthesizing unit such that synthesis proportions of the plurality of image signals in the synthetic image signal are determined according to a common capacity of the charge accumulating unit when the capacity of the charge accumulating unit is shared by the plurality of image signals.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. The following embodiments do not limit the present invention based on the appended claims, and not all combinations of features described in the embodiments are necessary for the present invention.

First Embodiment

Figure 1:
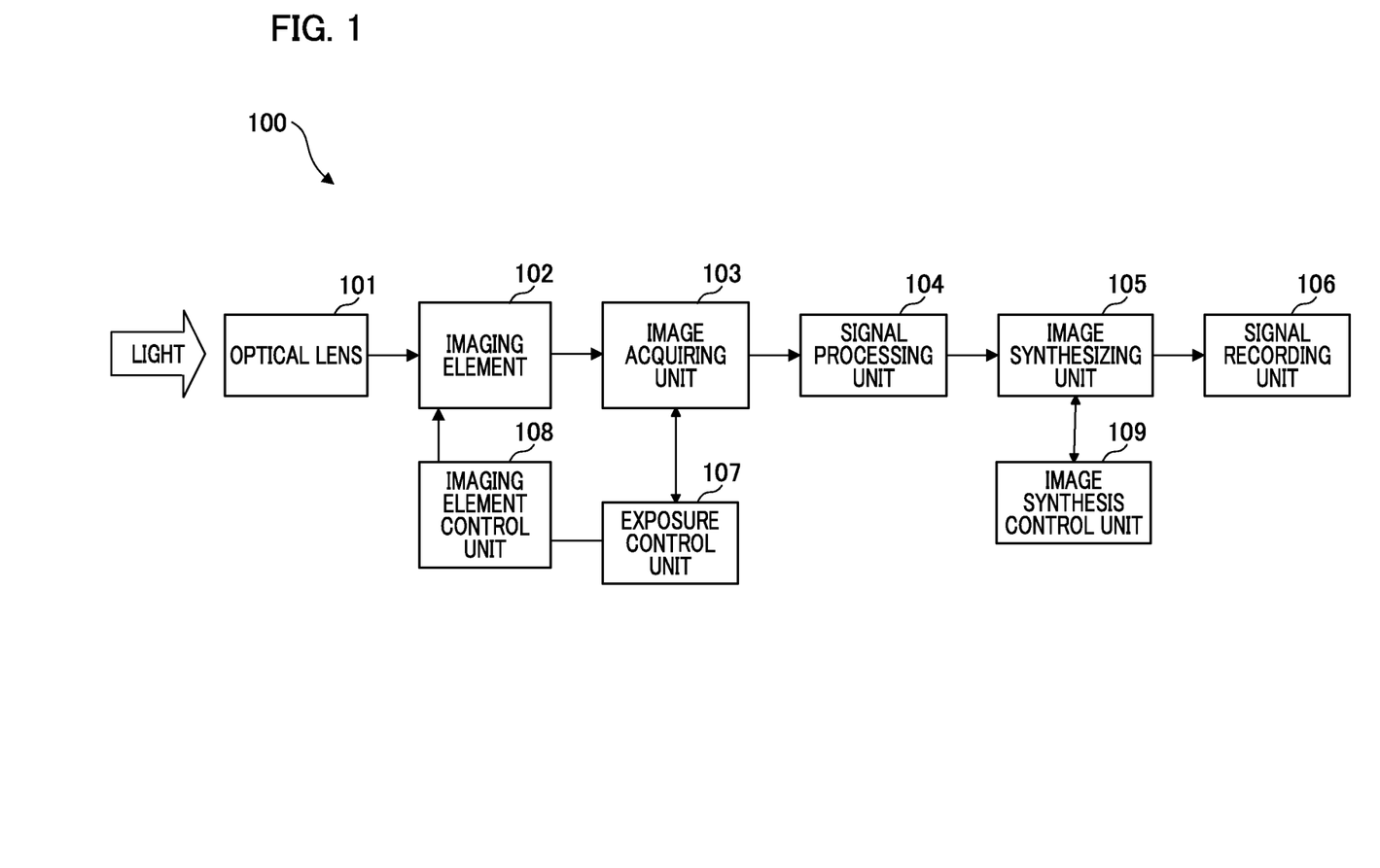
FIG. 1 is a block diagram illustrating an image processing device according to an embodiment of the present invention.

FIG. 1 is a block diagram illustrating a configuration of an image processing device 100 according to a first embodiment. Blocks illustrated in FIG. 1 will be described below in detail. The image processing device 100 (an imaging device) includes a CPU (not illustrated) that controls constituents of the device and also includes a recording medium or a recording device such as a ROM or a RAM.

An optical lens 101 is an optical lens serving to receive light of a subject. Light incident on the optical lens 101 forms an image on an imaging element 102.

The imaging element 102 converts incident light received from the optical lens 101 to an electrical signal and outputs the electrical signal as an image signal. A representative example of the imaging element 102 is a charge-coupled device (CCD) image sensor or a CMOS image sensor.

As the image signal output from the imaging element 102, an analog image signal may be directly output or a digital signal undergoing an analog-digital (AD) conversion process may be output. The AD conversion process is performed in the imaging element 102. The output digital signal is a digital signal such as low-voltage differential signaling (LVDS). A detailed configuration of the imaging element will be described later.

An image acquiring unit 103 includes blocks for capturing an image signal output from the imaging element 102 and performing various processes. When AD conversion is not performed in the imaging element 102, the image acquiring unit 103 includes an analog front end that performs AD conversion. The image acquiring unit 103 performs removal of fixed-pattern noise of the imaging element 102, black level clamping, and the like. The image acquiring unit 103 also serves to separate an image into an image used to record an image signal and an evaluation signal used to control the imaging element.

A signal processing unit 104 performs a pixel addition function which is a representative image processing function of an image processing device and various types of image processing such as noise reduction, gamma correction, knee correction, and defect correction such as digital gain correction. Although not illustrated in the block diagram, the image acquiring unit 103 and the signal processing unit 104 include a storage circuit that stores set values required for correction or image processing.

An image synthesizing unit 105 synthesizes image signals for HDR generation output from the imaging element as an HDR image signal using an arbitrary synthesis method. For example, a synthesis method using a high-gain image signal as a main image signal (a normal image) and using a low-gain image signal for a bright part with halation in the normal image is known. However, the method of synthesizing an HDR image signal in this embodiment is not limited to this synthesis method as long as it can synthesize two image signals with different gains. The image synthesizing unit 105 is controlled by an image synthesis control unit 109 that controls at least a synthesis proportion in generating a synthetic image signal.

A signal recording unit 106 records an image signal received from the image synthesizing unit 105 in a storage device or a storage medium. An exposure control unit 107 calculates an optimal exposure value based on image signal information received from the image acquiring unit 103 and determines an operation of an imaging element control unit 108. The imaging element control unit 108 transmits a control signal to the imaging element 102 and controls the imaging element 102.

Figure 2:
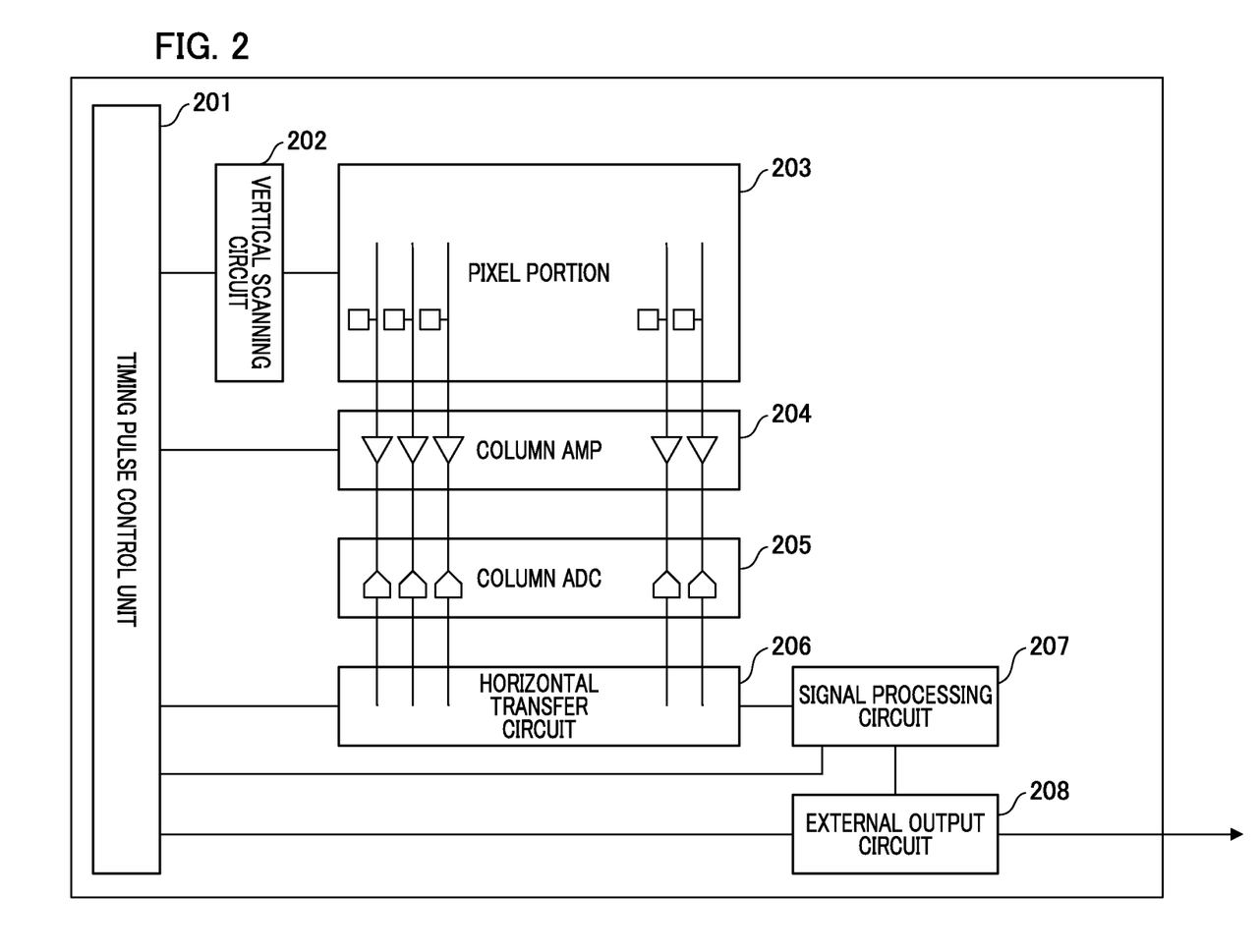
FIG. 2 is a diagram illustrating blocks in a solid-state imaging device.

FIG. 2 is a diagram illustrating blocks in a solid-state imaging element. In FIG. 2, blocks of an imaging element are illustrated as an example of the imaging element used in this embodiment.

A timing pulse control unit 201 controls the operation of the imaging element by supplying operation clocks (CLK) to the blocks of the imaging element or supplying timing signals to the blocks.

A vertical scan circuit 202 performs timing control for sequentially reading pixel signal voltages of pixel units 203 which are two-dimensionally arranged in one frame. In general, an image signal is sequentially read row by row from an upper row to a lower row in one frame.

Each pixel unit 203 includes a photoelectric conversion element (a photoelectric conversion unit) that performs photoelectric conversion according to an incident light intensity and outputs the result as a voltage. After converting incident light to electric charge, the pixel unit 203 accumulates the electric charge in a floating diffusion (FD) serving as a charge accumulating unit. The magnitude of an FD capacity can increase or decrease. That is, a first capacity which is a relatively large FD capacity and a second capacity which is a capacity smaller than the first capacity can be selected as the FD capacity. A signal-to-noise (S/N) ratio can be improved by changing the FD capacity according to an ISO speed. Basically, the FD capacity is set to be large at a low ISO speed and the FD capacity is set to be small at a high ISO speed. When two image signals with different gains which will be described later are output, the FD capacities for the two image signals with different gains are shared. The magnitude of the FD capacity is not limited to two levels of large and small, but may be set to three or more levels.

A column AMP 204 (an amplification unit) is an amplifier that is used to electrically amplify a signal read from the pixel unit 203. By amplifying a signal using the column AMP 204, a signal level of a pixel can be amplified relative to noise from a column ADC 205 and thus the S/N ratio can be improved. A gain of the column AMP 204 can be changed by the timing pulse control unit 201. The imaging element 102 according to this embodiment may include two input memories in the column AMP 204 for generation of an HDR image and output two types of gains by changing gain settings in the column AMP. Since two input memories are provided, two different gains can be applied to a signal at a certain time output from an FD of a pixel unit and the resultant signals can be output. The two gains include a first gain which is relatively large and a second gain which is smaller than the first gain. Accordingly, an amount of data is increased, but two synchronized images with different gains can be acquired. In this embodiment, two images are output, but the number of images which are simultaneously output is not limited two.

A column analog-digital converter (ADC) 205 performs analog-digital conversion on a signal read from the column AMP 204. A horizontal transfer circuit 206 sequentially reads signals which have been digitized by the column ADC 205. An output of the horizontal transfer circuit 206 is input to a signal processing circuit 207.

The signal processing circuit 207 is a circuit that digitally processes a signal. The signal processing circuit 207 performs a shift operation or multiplication in addition to addition of a predetermined offset value as a digital process. Accordingly, it is possible to simply calculate a gain. A pixel area which is intentionally shaded from light may be provided in the pixel unit 203 and a digital black level clamping operation using the pixel area may be performed.

An external output circuit 208 receives the output of the signal processing circuit 207. The external output circuit 208 has a serializer function and converts multibit input parallel signals from the signal processing circuit 207 to a serial signal. The external output circuit 208 converts the serial signal to, for example, an LVDS signal and outputs the resultant signal through transmission and reception of image information to and from an external device. In this way, the imaging element 102 outputs a plurality of image signals with different gains applied thereto through one exposure.

Figure 3:
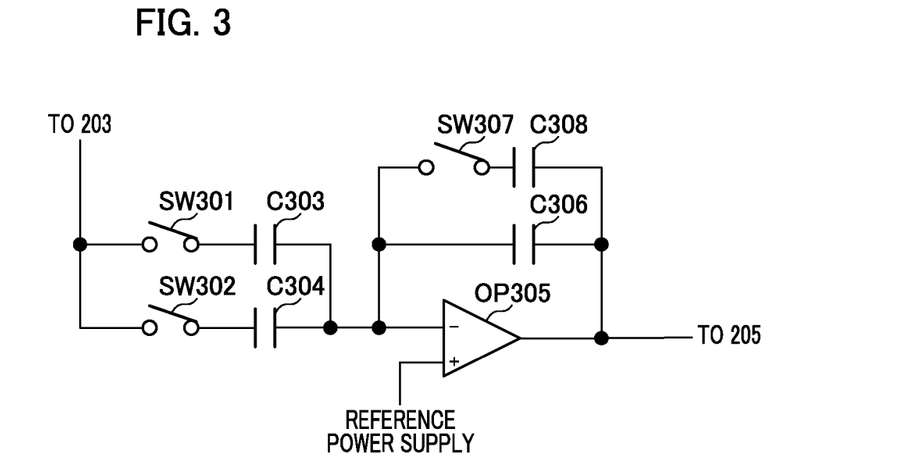
FIG. 3 is a diagram illustrating a column AMP of the solid-state imaging device.

The operation of the imaging element at the time of generation of an HDR image and the image synthesizing unit 105 will be described below. As described above, the imaging element according to this embodiment can change a column AMP gain to generate an HDR image and output the HDR image. The operation of the column AMP 204 at the time of generation of an HDR image is illustrated in FIG. 3. FIG. 3 is a diagram illustrating a column AMP of a solid-state imaging element. In FIG. 3, a circuit of one column taken from the column AMP 204 is illustrated. A capacitive element is referred to as C, a switching element (such as a transistor) is referred to as SW, and an operation amplifier is referred to as OP.

Input capacitors and feedback capacitors are connected to the OP 305. A C 303 and a C 304 are input capacitors and couple a signal read from the pixel unit 203 to an SW 301 and an SW 302. A C 306 and a C 308 are feedback capacitors and can control coupling of the C 308 using an SW 307. Since capacitors are used, an amplification factor of the amplifier is equal to input capacitance/feedback capacitance. In this embodiment, two input capacitors are provided. Accordingly, first, gains of the C 303 and the C 306 are applied to a signal by turning on the SW 301 and turning off the SW 302, and the resultant signal is output to the column ADC 205. Then, gains of the C 304, the C 306, and the C 308 are applied to the signal by turning off the SW 301 and turning on the SW 302 and the SW 307, and the resultant signal is output. Accordingly, two images acquired from image signals with different gains applied thereto can be output. Then, the image synthesizing unit 105 synthesizes a plurality of image signals and generates a synthetic image signal. In the following description, synthesizing "image signals" may be expressed as synthesizing "images" as needed.

Figure 4:
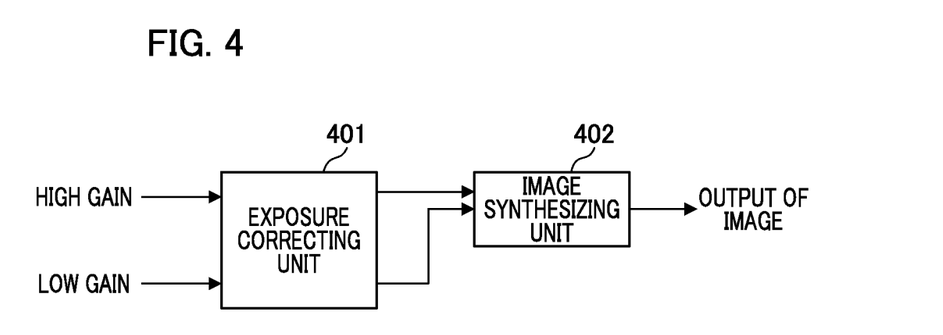
FIG. 4 is a block diagram illustrating an image synthesizing unit according to the embodiment.

FIG. 4 is a block diagram illustrating the image synthesizing unit 105 according to this embodiment. In FIG. 4, a situation in which two images with two types of gains applied thereto which are output from the imaging element 102 pass through the processing blocks of the signal processing unit 104 and the image synthesizing unit 105 is illustrated. Here, the two images include a high-gain image (hereinafter referred to as an H image) and a low-gain image (hereinafter referred to as an L image). An exposure correcting unit 401 sets the gains of the H image (a first image signal) and the L image (a second image signal) to be equal to each other. Accordingly, when the images are synthesized into one image by an image synthesizing unit 402, an output which is linear to an input signal is obtained.

Figure 5A:
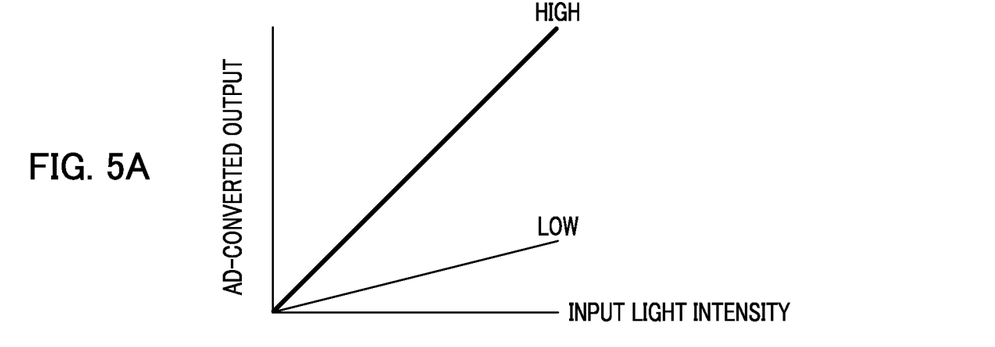
FIGS. 5A, 5B, and 5C are graphs illustrating a relationship between an input light intensity and an AD-converted output code according to a first embodiment.
Figure 5B:
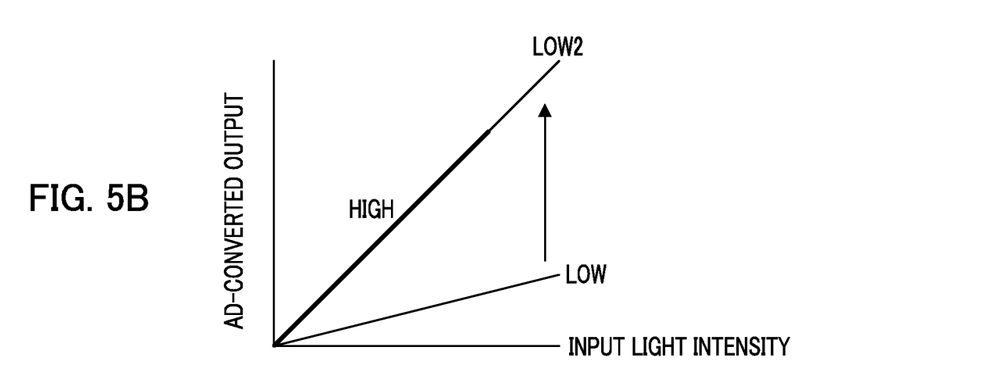
Figure 5C:
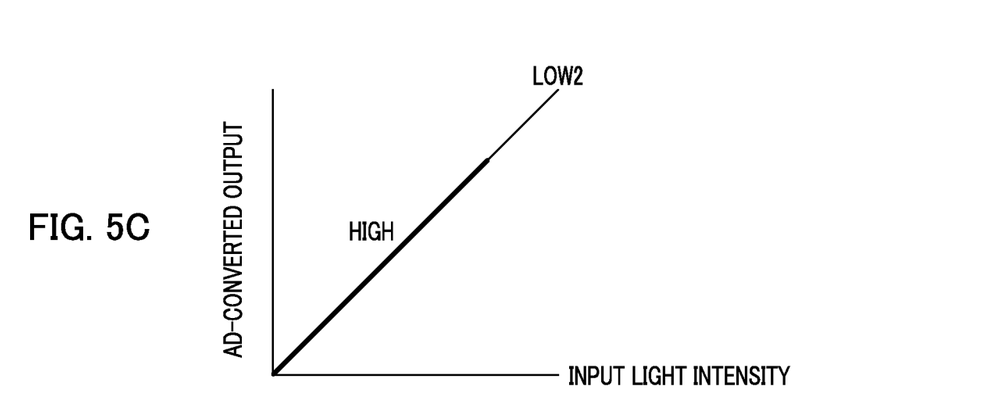

FIGS. 5A, 5B, and 5C are graphs illustrating a relationship between an input light intensity and an AD-converted output code according to the first embodiment. In FIGS. 5A, 5B, and 5C, input light intensities of an H image and an L image are plotted on the horizontal axis, and an AD-converted output code is plotted on the vertical axis. Candelas (cd) are mainly used as the unit of the light intensity on the horizontal axis.

FIG. 5A illustrates a graph of an H image (a bold solid line) and an L image (a fine solid line). In the state illustrated in FIG. 5A, two images have different brightness values and thus cannot be synthesized in that state.

Accordingly, the exposure correcting unit 401 applies a gain to the H image and the L image to match the brightness thereof. FIG. 5B illustrates an example in which the brightness of the L image is adjusted to the brightness of the H image. An image obtained by correcting an exposure value of the L image and adjusting the brightness thereof to that of the H image is defined as a low-gain second image (hereinafter referred to as an L2 image). In the example illustrated in FIG. 5B, the gain applied by the exposure correcting unit 401 is greater than 1. On the other hand, when the brightness of the H image is adjusted to the brightness of the L image, the gain is less than 1.

FIG. 5C is a graph showing the state after synthesis and illustrates an example in which the H image and the L2 image are synthesized. The synthesis is performed using the H image for a part of the H image with a small input light intensity and using the L2 image for a part with a large input light intensity.

Figure 6:
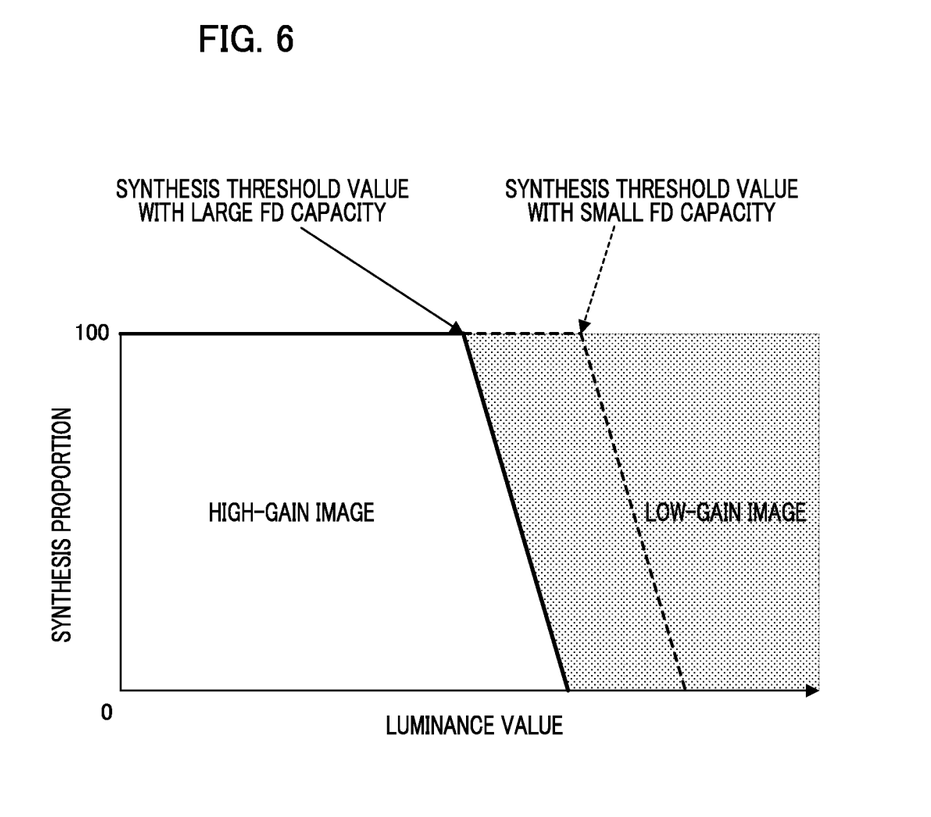
FIG. 6 is a diagram illustrating a relationship between a synthesis threshold value and an FD capacity according to the first embodiment.

FIG. 6 is a diagram illustrating a relationship between a synthesis threshold value and an FD capacity according to the first embodiment. In FIG. 6, a synthesis threshold value indicating synthesis proportions of an H image and an L image based on luminance corresponding to the FD capacity in which electric charge is accumulated. In the drawing, the synthesis threshold value used for synthesis is changed according to the magnitude of the FD capacity in which electric charge at the time of imaging is accumulated. Specifically, the synthesis threshold value is shifted to a lower luminance side as the FD capacity becomes larger. Here, it is assumed that an FD capacity shared by all of a plurality of image signals is set to a large capacity at the time of performing DGO. When the FD capacity is large, the FD capacity is set to be appropriate for the L image and thus noise of the H image is increased. Accordingly, the synthesis threshold value is set to a lower luminance side such that an area (a synthesis proportion) of the H image in a synthetic image decreases. That is, the synthesis threshold value when the FD capacity is large is set to a side of a lower luminance value than the synthesis threshold value when the FD capacity is small.

Figure 7:
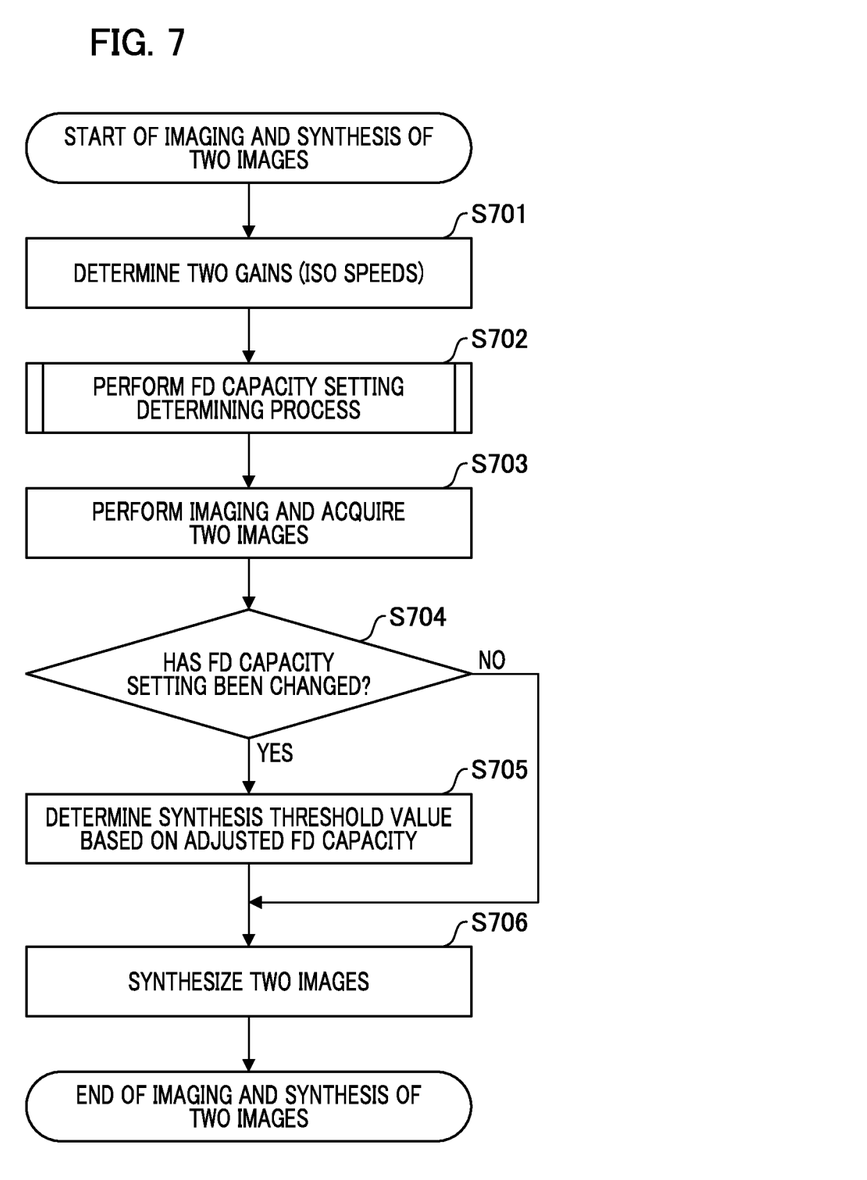
FIG. 7 is a flowchart illustrating a flow for determining a synthesis threshold value according to the first embodiment.

An example in which a user captures two images using the imaging element 102 that can output a plurality of images with different gains applied thereto and synthesizes the two images as described above will be described below. This description will be made with reference to the flowchart illustrated in FIG. 7. FIG. 7 is a flowchart illustrating a flow for determining the synthesis threshold value according to the first embodiment.

In Step 701, ISO speeds of an H image and an L image to be captured are determined. The ISO speeds may be determined manually by a user or may be determined automatically by a camera.

In Step S702, a process of determining setting of an FD capacity is performed. A detailed process of Step S702 will be described later. After the FD capacity determining process has been performed in Step S702, two images with different gains are captured in Step S703.

In Step S704, it is determined whether a process of adjusting settings of the FD capacity has been performed in Step S702. When it is determined that the process of changing settings of the FD capacity has been performed in Step S702, the flow proceeds to Step S705. On the other hand, when it is determined that the process of changing settings of the FD capacity has not been performed in Step S702, the flow proceeds to Step S706.

In Step S705, a synthesis threshold value is determined based on the settings of the FD capacity of the captured images. When the process of Step S702 has been performed, the FD capacity of the H image is set to a larger FD capacity than the FD capacity suitable for the H image. Accordingly, noise of the H image is increased. In this case, as described above with reference to FIG. 6, the synthesis threshold value is set to a lower luminance side according to the magnitude of the set FD capacity. Accordingly, an area of the H image in a synthetic image can be decreased and an influence of noise in the synthetic image can be reduced.

In Step S706, the two images are synthesized. The synthesis threshold value changed in Step S705 or the non-changed synthesis threshold value determined in Step S702 is used as the synthesis threshold value used to synthesize the images. When the images are synthesized, the two images are matched in brightness by the block illustrated in FIG. 4 and are synthesized as illustrated in FIG. 5C. A method of setting the synthesis threshold value to a fixed value for the FD capacities is used as the method of determining the synthesis threshold value corresponding to the FD capacity. However, the method of determining the synthesis threshold value is not limited thereto.

Figure 8:
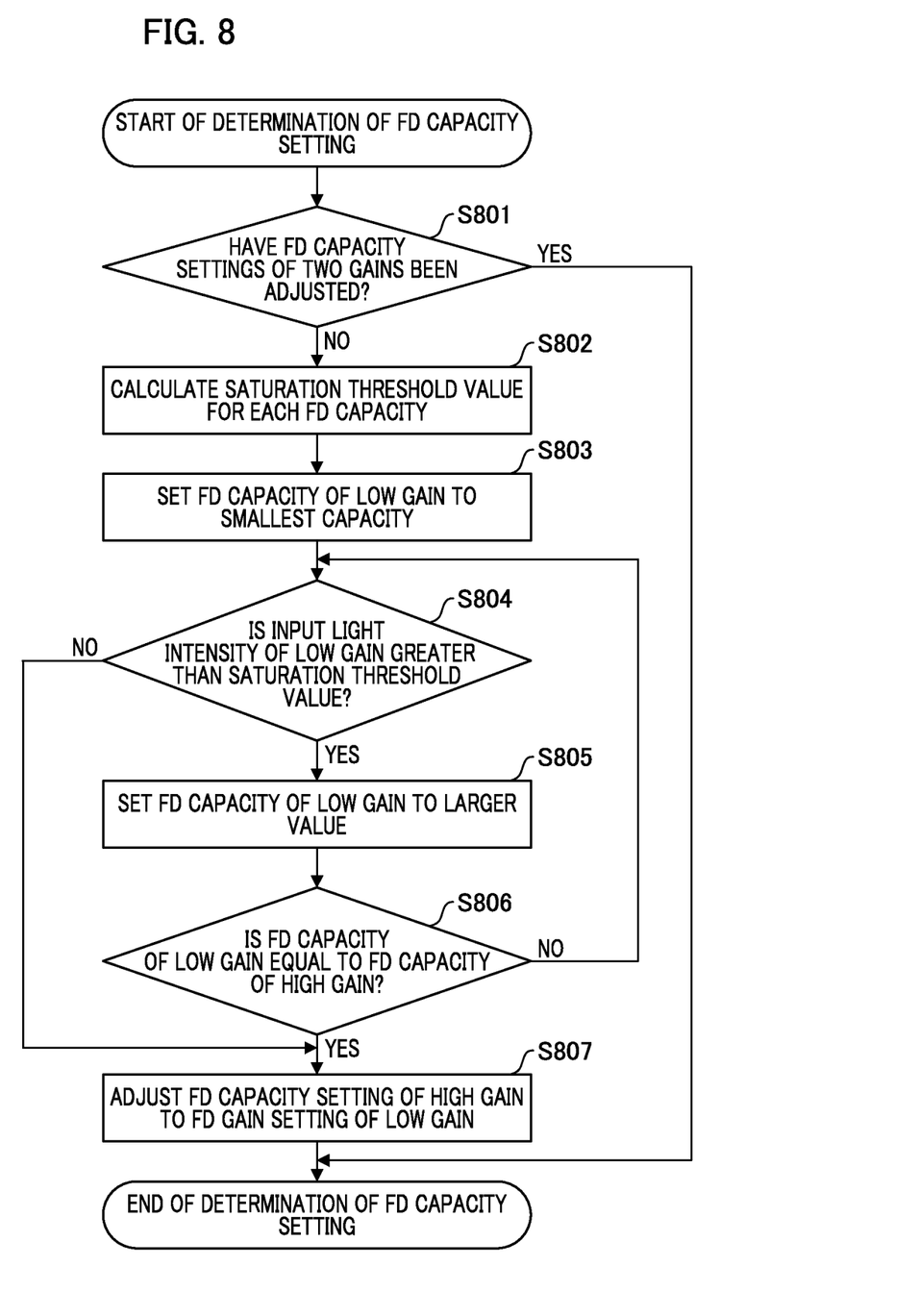
FIG. 8 is a flowchart illustrating a flow for determining FD capacity settings according to the first embodiment.

The FD capacity setting determining process of Step S702 will be described below in detail with reference to FIG. 8. FIG. 8 is a flowchart illustrating a flow for determining a setting of the FD capacity according to the first embodiment. Setting of an FD capacity at the time of imaging does not cause any problem when an FD capacity set to be appropriate for a set ISO speed is shared by an H image and an L image. However, it is necessary to determine what FD capacity is to be set for a combination of an H image and an L image in which an appropriate FD capacity is not set. Details thereof will be described below.

In Step S801, it is determined whether the FD capacity of the H image and the FD capacity of the L image are matched. When the FD capacities are not matched, the flow proceeds to Step S802. On the other hand, when the FD capacities are matched, the process of determining settings of the FD capacity ends.

In Step S802, a saturated threshold value is calculated for each FD capacity. Specifically, the saturated threshold value is an output value of the imaging element after being AD-converted at a light intensity at which the FD capacity is saturated.

In Step S803, the FD capacity of a low gain is set to a smallest capacity. For example, when the capacities can be set to two levels, the smaller FD capacity is set.

In Step S804, it is determined whether an input light intensity of a low gain exceeds the saturated threshold value for the FD capacity set to the smallest capacity. When the input light intensity of a low gain exceeds the saturated threshold value for the FD capacity set to the smallest capacity, the flow proceeds to Step S805. On the other hand, when the input light intensity of a low gain does not exceed the saturated threshold value for the FD capacity set to the smallest capacity, the flow proceeds to Step S807.

In Step S805, the FD capacity set for the low gain is changed to achieve a larger saturated threshold value. Specifically, the set value of the FD capacity is changed to a value which is larger by one step.

In Step S806, the FD capacity of the low gain and the FD capacity of the high gain are compared. When the FD capacity of the low gain and the FD capacity of the high gain are equal to each other, the flow proceeds to Step S807. On the other hand, when the FD capacity of the low gain and the FD capacity of the high gain are not equal, the flow proceeds to Step S804.

In Step S807, the FD capacity of the high gain is adjusted to the FD capacity of the low gain. After Step S807, the flow ends.

Figure 9:
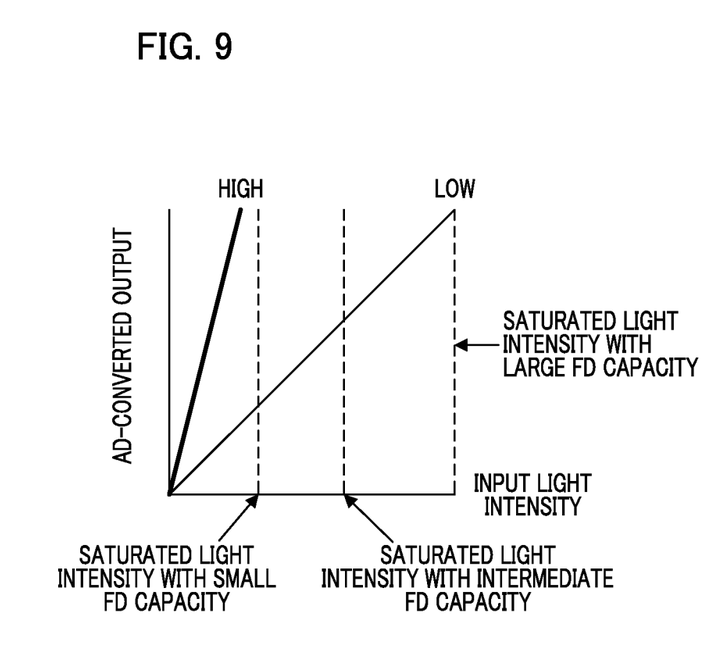
FIG. 9 is a diagram illustrating a relationship between an input light intensity and an FD capacity according to the first embodiment.

The FD capacity setting determining process will be described below with reference to an example in which the FD capacity is settable to three levels. FIG. 9 is a diagram illustrating a relationship between an input light intensity and an FD capacity according to the first embodiment. In the drawing, the horizontal axis represents the input light intensity and the vertical axis represents an AD-converted output. A saturated light intensity for each FD capacity is indicated by a dotted line.

When there are three levels of FD capacities (a large FD capacity, an intermediate FD capacity, and a small FD capacity) as illustrated in FIG. 9, the input light intensity may not be greater the saturated light intensity (a saturation threshold value) of the small FD capacity. In this case, the FD capacity used for the high gain does not have to be adjusted to the FD capacity used for the low gain. That is, the FD capacity for the low gain may be changed and the FD capacity for the high gain may be adjusted to the changed FD capacity. Accordingly, it is possible to reduce an influence of noise appearing in the high gain.

When the FD capacity is settable to three or more levels as illustrated in FIG. 9, the processes of Steps S804 to S806 are repeatedly performed. When the input light intensity does not exceed the saturated threshold value, the FD capacity for the low gain is changed to a smaller capacity. Finally, in Step S807, the FD capacity for the high gain is adjusted to the FD capacity for the low gain.

According to the aforementioned first embodiment, the FD capacity for the low gain and the FD capacity for the high gain are matched and then the synthesis threshold value is determined based on the matched FD capacity. When the synthesis threshold value is determined, a high-gain image is set to decrease when a relatively large (high) FD capacity is selected rather than when a relatively small (low) FD capacity is selected. Accordingly, when the FD capacity is large, it is possible to decrease the high-gain image and to reduce noise of the synthetic image.

Second Embodiment

In a second embodiment, a synthesis threshold value which is a threshold value for a synthesis proportion is determined based on a set FD capacity and a temperature of the imaging element. An image processing device according to this embodiment includes a temperature sensor that measures the temperature of the imaging element 102, and a measurement result from the temperature sensor is input to the image synthesizing unit 105. The other elements described above in the first embodiment such as the configuration of the image processing device will not be described.

Figure 10:
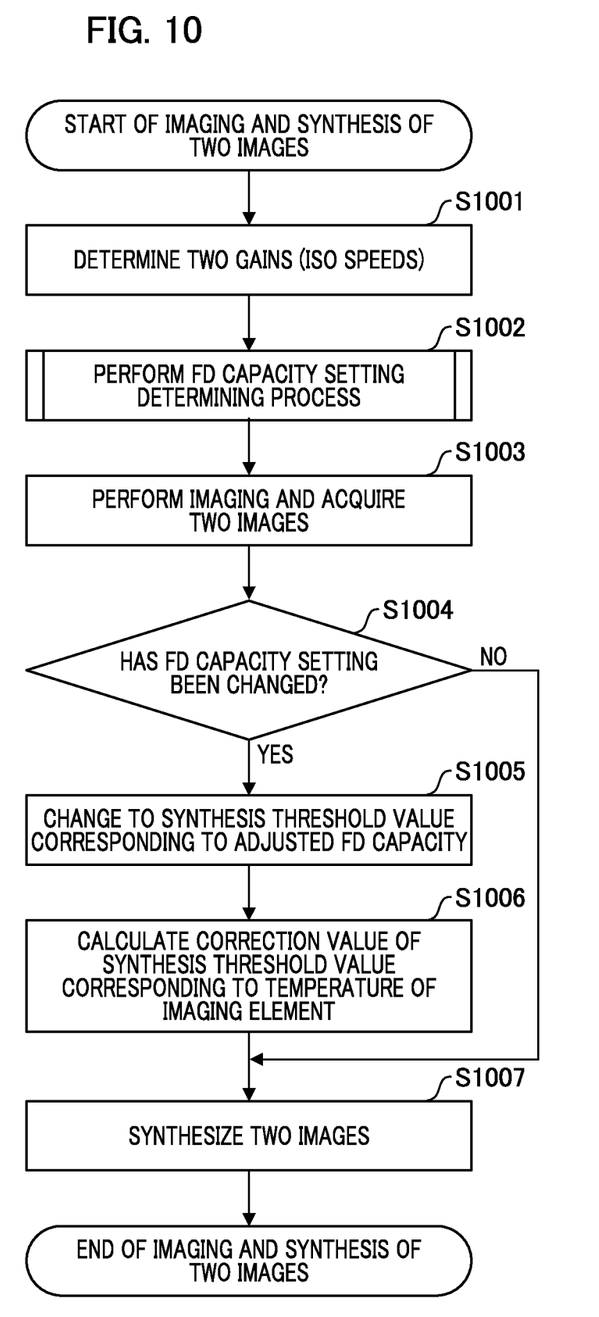
FIG. 10 is a flowchart illustrating a flow for determining a synthesis threshold value according to a second embodiment.

FIG. 10 is a flowchart illustrating a flow for determining a synthesis threshold value according to the second embodiment. Steps S1001 to S1005 are the same as Steps S701 to S705 in FIG. 7.

In Step S1006, the synthesis threshold value is corrected based on the temperature of the imaging element. As the temperature of the imaging element increases, noise of an H image increases. Accordingly, the synthesis threshold value is adjusted such that the area of an H image in a synthetic image decreases as the temperature of the imaging element increases.

In Step S1007, two images including an H image and an L image are synthesized. The synthesis threshold value corrected in Step 1006 or the non-changed synthesis threshold value determined in Step S1004 is used as the synthesis threshold value used to synthesize the images.

Figure 11:
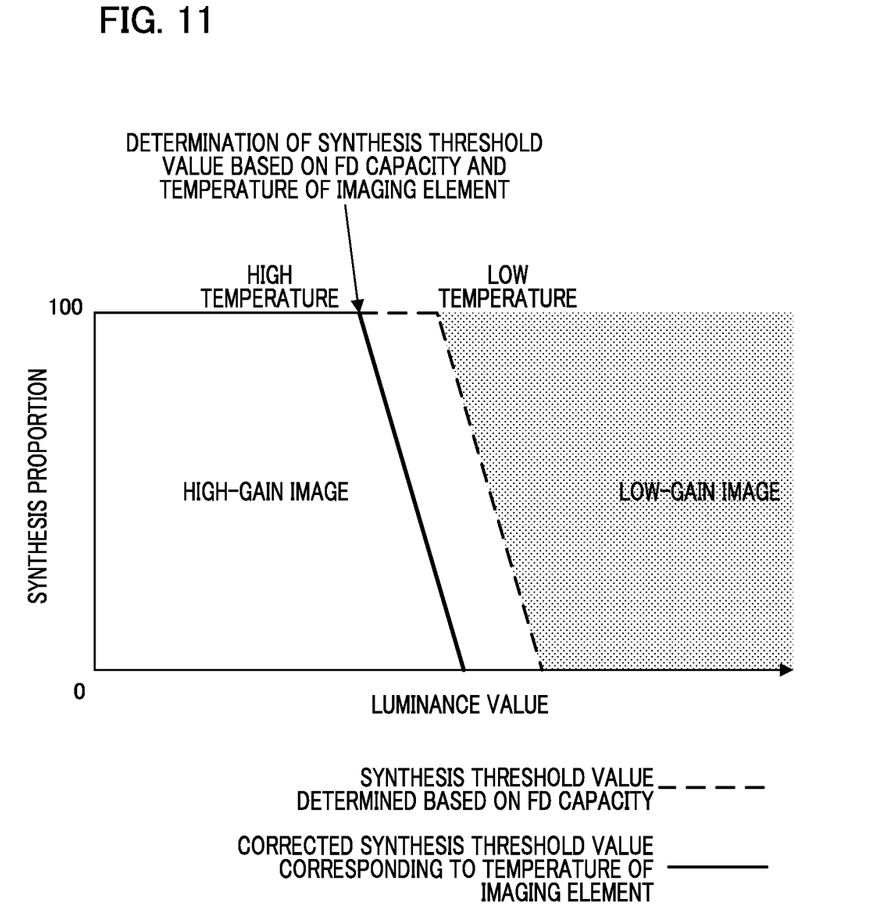
FIG. 11 is a diagram illustrating a relationship between a synthesis threshold value and a temperature of an imaging element according to the second embodiment.

The correcting of the synthesis threshold value in Step S1006 will be described below with reference to FIG. 11. FIG. 11 is a diagram illustrating a relationship between the synthesis threshold value and the temperature of the imaging element according to the second embodiment. As illustrated in FIG. 11, in Step S1006, the synthesis threshold value is changed to a low luminance side such that the area of the H image further decreases from that with the synthesis threshold value determined in Step S1005 as the temperature of the imaging element increases. Accordingly, it is possible to reduce an influence of noise in a synthetic image according to the temperature of the imaging element. The method of changing the synthesis threshold value according to the temperature of the imaging element is not limited to that described in this embodiment. Another method may be used as long as it is a method of changing the synthesis threshold value such that the area of the H image decreases as the temperature of the imaging element increases.

According to the aforementioned second embodiment, the synthesis threshold value for the H image and the L image is changed to a lower luminance side and the synthesis threshold value is also corrected such that the area of the H image decreases as the temperature of the imaging element increases. Accordingly, it is possible to reduce noise in a synthetic image.

Third Embodiment

In a third embodiment, in addition to the configurations of the aforementioned embodiments, a luminance-noise distribution is calculated from a captured image and a synthesis threshold value is determined based on the luminance-noise distribution. When a luminance-noise distribution with a sufficient area cannot be prepared in calculating the luminance-noise distribution, the synthesis threshold value is determined based on the set FD capacity. The same elements as in the aforementioned embodiments will not be repeatedly described.

Figure 12:
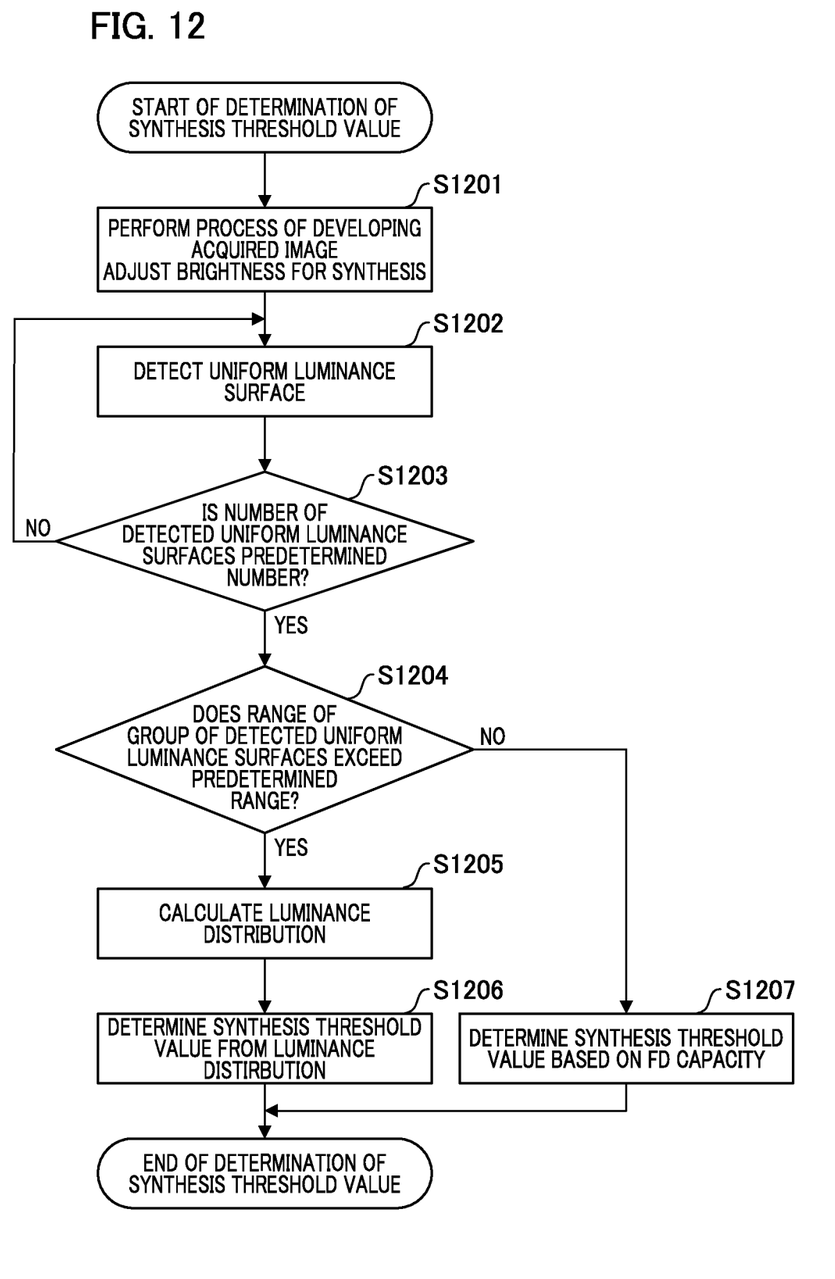
FIG. 12 is a flowchart illustrating a flow for determining a synthesis threshold value according to a third embodiment.

FIG. 12 is a flowchart illustrating a flow for determining a synthesis threshold value according to the third embodiment. In FIG. 12, a routine of calculating a luminance-noise distribution and determining a synthesis threshold value at the time of determination of the synthesis threshold value after imaging is illustrated.

In Step S1201, a development process is performed to calculate a luminance-noise distribution. Here, two images including an H image and an L image are matched in brightness. In this embodiment, an example in which the H image is used as a base image, the L image is matched in brightness with the H image, and an exposure value of an L2 image is corrected is described.

In Step S1202, a uniform luminance surface is detected from the H image and the L2 image. The uniform luminance surface is an area including no edge or a small edge and is an area in which a difference between a maximum luminance value and a minimum luminance value in the area is equal to or less than a threshold value.

In Step S1203, it is determined whether a predetermined number of uniform luminance surfaces have been acquired. When a predetermined number of uniform luminance surfaces have been acquired, the flow proceeds to Step S1204. On the other hand, when a predetermined number of uniform luminance surfaces have not been acquired, the flow proceeds to Step S1202.

In Step S1204, it is determined whether an area of the detected uniform luminance surfaces (a range of the uniform luminance surfaces) is equal to or greater than a predetermined range. Whether the area of the uniform luminance surfaces is sufficiently large is determined particularly by determining whether a possible synthesis threshold value is included therein.

In Step S1205, noise in the area of the detected uniform luminance surfaces in the H image is measured, and noise in the same area in the L2 image is measured. The luminance-noise distributions of the H image and the L2 image are calculated based on the result of measurement of noise.

In Step S1206, the synthesis threshold value is determined based on a luminance value at which the noise of the H image and the noise of the L2 image are inverted based on the luminance-noise distributions calculated in Step S1205. In this embodiment, a luminance value at which the noise of the H image is not greater than the noise of the L2 image is determined as the synthesis threshold value based on the luminance value at which the noise of the H image and the noise of the L2 image are inverted. After Step S1206, the flow ends.

In Step S1207, as described above in the aforementioned embodiments, the synthesis threshold value is calculated based on the set FD capacity. In this way, when the uniform luminance surfaces in a sufficient range cannot be detected in Step S1204, the process of Step S1207 is performed. After Step S1207, the flow ends.

According to the aforementioned third embodiment, it is possible to achieve a more accurate noise reduction effect using the luminance-noise distributions. In a situation in which it is difficult to detect a uniform luminance surface, it is possible to achieve a predetermined noise reduction effect by determining the synthesis threshold value based on the set FD capacity.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-013571, filed Jan. 29 2021, which is hereby incorporated by reference wherein in its entirety.

What is claimed is:

1. An image processing device comprising:
an imaging element that includes a pixel unit including a photoelectric conversion unit configured to convert light to electric charge and a charge accumulating unit configured to accumulate the electric charge and an amplification unit configured to amplify a signal output from the pixel unit with different gains and outputs a plurality of image signals with different gains applied thereto through one exposure; and
a controller having a processor which executes instructions stored in a memory, the controller being configured to function as:
an image synthesizing unit configured to generate a synthetic image signal by synthesizing the plurality of image signals; and
an image synthesis control unit configured to control the image synthesizing unit such that synthesis proportions of the plurality of image signals in the synthetic image signal are determined according to a common capacity of the charge accumulating unit when the capacity of the charge accumulating unit is shared by the plurality of image signals.

2. The image processing device according to claim 1, wherein the capacity of the charge accumulating unit includes a first capacity and a second capacity which is smaller than the first capacity,
wherein the plurality of image signals include a first image signal that is amplified with a first gain and a second image signal that is amplified with a second gain which is smaller than the first gain, and
wherein the image synthesis control unit is configured to set the synthesis proportion of the first image signal in the synthetic image signal to be less when the common capacity of the charge accumulating unit is the first capacity than when the common capacity of the charge accumulating unit is the second capacity.

3. The image processing device according to claim 1, wherein the image synthesizing unit is configured to change the synthesis proportions according to a temperature of the imaging element.

4. The image processing device according to claim 2, wherein the image synthesizing unit is configured to perform correction such that the synthesis proportion of the first image signal in the synthetic image signal decreases with an increase in temperature of the imaging element.

5. The image processing device according to claim 1, further comprising an imaging element control unit configured to control the gains of the signals and the capacities of the charge accumulating unit,
wherein the imaging element control unit is configured to:
calculate a threshold value with which the capacity of the charge accumulating unit is saturated on the basis of a signal voltage which is acquired with a relatively low gain out of a plurality of gains for the signals; and
determine the capacity of the charge accumulating unit such that the capacity of the charge accumulating unit decreases as long as an input light intensity of the pixel unit is not greater than the threshold value.

6. The image processing device according to claim 1, wherein the image synthesizing unit is configured to calculate a luminance-noise distribution of each image signal for the plurality of image signals and to change the synthesis proportions of the plurality of image signals in the synthetic image signal on the basis of the luminance-noise distribution and the capacity of the charge accumulating unit.

7. An image processing method comprising:
outputting a plurality of image signals with different gains applied thereto through one exposure from an imaging element by amplifying a signal output from a pixel unit, which includes a photoelectric conversion unit configured to convert light to electric charge and a charge accumulating unit configured to accumulate the electric charge, with the different gains; and
generating a synthetic image signal by synthesizing the plurality of image signals,
wherein synthesis proportions of the plurality of image signals in the synthetic image signal are changed according to a common capacity of the charge accumulating unit when the capacity of the charge accumulating unit is shared by all the plurality of image signals at the time of generation of the synthetic image signal.

8. A non-transitory computer readable medium storing a program causing a computer to execute an image process, the image process comprising:
outputting a plurality of image signals with different gains applied thereto through one exposure from an imaging element by amplifying a signal output from a pixel unit, which includes a photoelectric conversion unit configured to convert light to electric charge and a charge accumulating unit configured to accumulate the electric charge, with the different gains; and
generating a synthetic image signal by synthesizing the plurality of image signals,
wherein synthesis proportions of the plurality of image signals in the synthetic image signal are changed according to a common capacity of the charge accumulating unit when the capacity of the charge accumulating unit is shared by all the plurality of image signals at the time of generation of the synthetic image signal.

* * * * *